US008000898B1

(12) United States Patent  (10) Patent No.: US 8,000,898 B1
Rose et al.  (45) Date of Patent: *Aug. 16, 2011

(54) WEATHER COLLECTION SYSTEM

(75) Inventors: Bruce L. Rose, Smyrna, GA (US); Ian James Miller, Marietta, GA (US); Eli L. Wendkos, Acworth, GA (US)

(73) Assignee: Strategic Design Federation W., Inc. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,471

(22) Filed: Jul. 7, 2010

Related U.S. Application Data

(63) Continuation of application No. 11/837,037, filed on Aug. 10, 2007, now Pat. No. 7,774,139.

(51) Int. Cl.
*G01W 1/00* (2006.01)
*G06F 17/40* (2006.01)
*G06F 19/00* (2006.01)

(52) U.S. Cl. .... 702/3; 73/170.16; 340/301; 340/870.07; 340/870.16; 702/187

(58) Field of Classification Search ............... 73/170.16, 73/170.17, 170.21, 170.24, 170.26, 170.27, 73/170.29, 170.31, 384; 340/500, 540, 580, 340/584, 600, 601, 602, 870.01, 870.07, 340/870.16, 870.17; 702/1, 2, 3, 4, 14, 15, 702/127, 130, 138, 187, 188, 189; 707/705, 707/722, 723, 732, 733, 736, 737, 748, 752, 707/754; 709/217, 218, 219; 715/200, 201, 715/273, 277, 700
See application file for complete search history.

(56) References Cited

U.S. PATENT DOCUMENTS

| | | | |
|---|---|---|---|
| 4,812,825 A | | 3/1989 | Kennedy et al. |
| 5,379,215 A | | 1/1995 | Kruhoeffer et al. |
| 5,628,050 A | | 5/1997 | McGraw et al. |
| 5,654,886 A | | 8/1997 | Zereski et al. |
| 5,990,805 A | | 11/1999 | Wicks et al. |
| 6,052,648 A | | 4/2000 | Burfeind et al. |
| 6,112,075 A | * | 8/2000 | Weiser ................. 455/404.1 |
| 6,300,871 B1 | | 10/2001 | Irwin et al. |
| 6,343,255 B1 | | 1/2002 | Peek et al. |
| 6,480,121 B1 | | 11/2002 | Reimann |
| 6,498,987 B1 | | 12/2002 | Kelly et al. |
| 6,542,825 B2 | | 4/2003 | Jones et al. |
| 6,654,689 B1 | * | 11/2003 | Kelly et al. ................. 702/3 |
| 6,823,263 B1 | * | 11/2004 | Kelly et al. ................. 702/3 |
| 6,917,297 B2 | | 7/2005 | Andrews et al. |
| 6,919,821 B1 | | 7/2005 | Smith |
| 6,937,148 B2 | | 8/2005 | Irwin |
| 6,995,686 B2 | | 2/2006 | Gosdin et al. |
| 7,031,663 B2 | * | 4/2006 | Heinonen et al. .......... 455/67.11 |
| 7,058,510 B2 | * | 6/2006 | Kelly et al. ................. 702/2 |
| 7,155,507 B2 | | 12/2006 | Hirano et al. |
| 7,406,382 B2 | | 7/2008 | Brulle-Drews |
| 7,774,139 B1 | * | 8/2010 | Rose et al. ................. 702/3 |
| 7,889,071 B2 | * | 2/2011 | Theimer et al. .......... 340/539.13 |
| 2001/0029535 A1 | | 10/2001 | Hirano et al. |

(Continued)

*Primary Examiner* — Edward R Cosimano
(74) *Attorney, Agent, or Firm* — Carlineo, Spicer & Kee, LLC

(57) ABSTRACT

A method of collecting weather data includes determining probable occurrences of weather events. Contact information corresponding to a plurality of users is maintained. Weather collection devices are sent to the plurality of users prior to the occurrence of the probable weather event. Data is collected by the weather collection devices upon the actual occurrence of the probable weather event.

29 Claims, 3 Drawing Sheets

U.S. PATENT DOCUMENTS

| | | | |
|---|---|---|---|
| 2001/0049584 A1* | 12/2001 | Jones et al. | 702/3 |
| 2002/0017988 A1 | 2/2002 | Irwin | |
| 2002/0038353 A1 | 3/2002 | Yamamoto | |
| 2002/0119769 A1* | 8/2002 | Heinonen et al. | 455/422 |
| 2004/0010372 A1* | 1/2004 | Schwoegler | 702/3 |
| 2004/0244476 A1 | 12/2004 | Andrews et al. | |
| 2004/0246145 A1 | 12/2004 | Andrews et al. | |
| 2005/0024236 A1 | 2/2005 | Gosdin et al. | |
| 2005/0049789 A1* | 3/2005 | Kelly et al. | 702/3 |
| 2005/0151656 A1* | 7/2005 | Yuen | 340/601 |
| 2005/0154531 A1* | 7/2005 | Kelly et al. | 702/3 |
| 2005/0187714 A1 | 8/2005 | Brulle-Drews | |
| 2007/0049260 A1* | 3/2007 | Yuhara et al. | 455/414.3 |
| 2008/0278313 A1 | 11/2008 | Theimer et al. | |

* cited by examiner

WEATHER COLLECTION SYSTEM

CROSS REFERENCE TO RELATED APPLICATION

This application is a Continuation of U.S. patent application Ser. No. 11/837,037, filed Aug. 10, 2007, now U.S. Pat. No. 7,774,139, and entitled Weather Collection System, the entire disclosure of which is incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
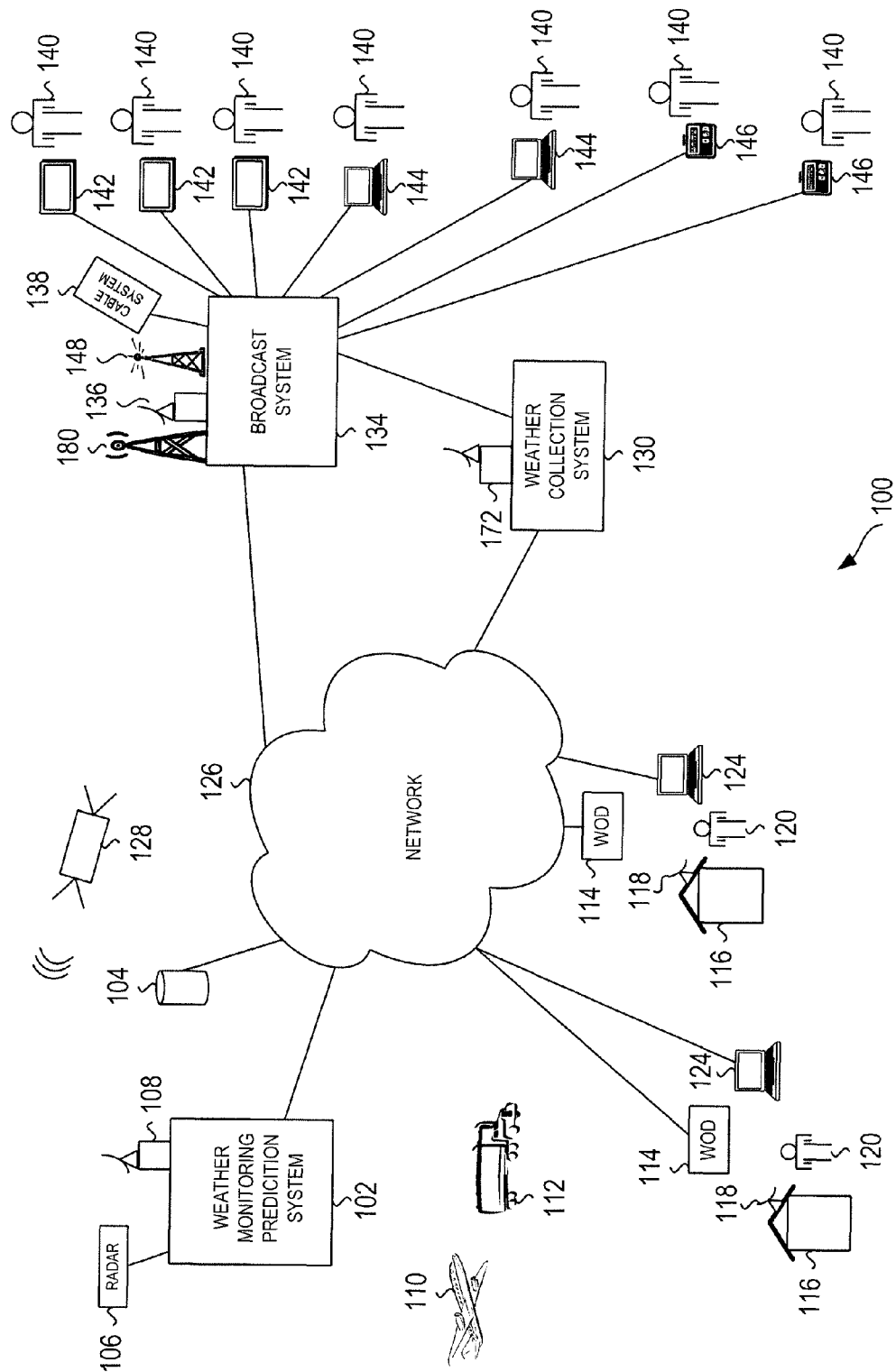
FIG. 1 is a system diagram in accordance with one embodiment of a weather content collection system.

Certain terminology is used herein for convenience only and is not to be taken as a limitation on the embodiments of the present invention. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

Referring to FIG. 1, a weather content collection system 100 for determining and aggregating weather content from a plurality of users 120 is shown. The weather content collection system 100 gathers real-time, substantially real-time and non real-time weather data and information from weather observation devices 114 by supplying the users 120 with the weather observation devices 114 when a weather event is expected or predicted to occur in a geographic region associated with the users 120. In general, the users 120 may be individuals, companies, organizations or other entities that participate in weather data collection and/or observation. In one embodiment the users 120 are members of a social network of weather enthusiasts who wish to participate in an effort to have more accurate and complete weather broadcasts. Alternatively, the users 120 are individuals whose contact information is stored in a list (e.g. a mailing list, a database or an email list) of individuals interested in weather collection and observation. The weather observation devices 114 are devices capable of measuring, detecting, collecting or otherwise observing weather conditions. Examples of the weather observation devices 114 include, but are not limited to disposable or non-disposable cameras, thermometers, video cameras, cell phones, barometers, hygrometers, light sensors, wind gauges, precipitation gauges, audio recorders or any other device generally known to those skilled in the art capable of detecting, measuring, collecting, observing or otherwise providing information about current or forecasted weather conditions. Examples of weather events include thunderstorms, hurricanes, tornadoes, droughts, forest fires, blizzards, ice storms, wind, rain, hail, snow, sleet or generally any other type of weather activity.

A weather monitoring and prediction system 102 monitors current and forecast weather to detect probable weather events in one or more geographic areas. The weather monitoring and prediction system 102 collects and monitors weather data via any combination of weather monitoring and collection devices generally known in the art (e.g., radar station or system 106, a satellite imagery system 108, a lightening detection device, a surface weather observation station, etc.). The weather monitoring and prediction system 102 may also obtain previously collected or historical weather data from one or more weather databases (not shown). The weather monitoring and prediction system 102 may also obtain analyzed weather data from one or more weather analysis systems (not shown). Using the weather data obtained from a combination of one or more of such sources, the weather monitoring and prediction system 102 determines predicted future weather conditions or weather events or the likelihood thereof. Such predictions of weather events may be may relative to a particular geographic area or region. The weather monitoring and prediction system 102 utilizes one or more computer-applied algorithms, traditional human-based meteorological analysis, or a combination thereof to predict the future weather in a geographic region. Thus, the weather monitoring and prediction system 102 employs any weather forecasting or predictions technique generally known in the art to predict weather events to help determine which geographic areas or regions are of interest, thereby determining which of the users 120 should receive weather observation devices 114.

When a probable weather event for a geographic region has been determined by the weather monitoring and prediction system 102, one or more weather observation devices 114 are sent to the users 120 in the corresponding geographic region. Users' contact information is retrieved from a storage device 104, and evaluated by the weather monitoring and prediction system 102 to determine an appropriate list of users 120 in the geographic region in which to send weather observation devises 114. Based on the type of predicted weather event, the weather monitoring and prediction system 102 also determines which of the weather observation devices 114 are appropriate to send to the corresponding users 120, i.e., what information, based on the expected weather event, would be valuable to collect. For example, if a severe rain storm is expected, the weather content collection system 100 may send a precipitation gauge along with a video camera to the identified users 120 in the corresponding region. Alternatively, if a hurricane is expected, the weather collection system 100 may send a precipitation gauge, a video camera, a hygrometer and a barometer. Some weather events may cause the weather content collection system 100 to send a disposable camera to the users 120. In addition, the weather monitoring and prediction system 102 determines which of the plurality of users 120 will receive which weather observation devices 114 based on their geographic proximity to the predicted weather event, the type of predicted weather event or some other metric. For example, if a hurricane is expected in the Gulf of Mexico, users in Louisiana, Mississippi and Florida may receive the appropriate weather observation devices 114. Alternatively, since tornadoes tend to occur with much shorter notice, weather observation devices 114 may be sent to all users in the Great Plains at the start of tornado season. Alternatively, the weather observation devices 114 may be sent to all users in the Great Plains states upon their registration and would be used over the course of several seasons. Although, FIG. 1 shows the storage device 104 attached to a network 126, the storage device 104 can alternatively be internal to the weather monitoring and prediction system 102 or attached directly to the weather monitoring and prediction system 102. The storage device 104 may be a hard disk drive, a stand alone computer, a networked drive, a paper file system controlled by an individual or any other storage device capable of maintaining this type of data.

Once the weather monitoring and prediction system 102 has determined a probable weather event in a geographic region, the weather observation devices 114 are delivered to the users in the identified region. The weather observation devices 114 may be sent in an automated manner or may require manual human interaction to initiate delivery. In cases where the weather observation device 114 necessitates the user 120 using a physical device, the weather content collection system 100 may send the appropriate device 114 to the user 120 via mail, courier, or any other delivery service or any combination of delivery mechanisms generally available, including via an airplane 110, a truck 112 or other transportation means such as a car or a ship (not shown). The network 126 may also be used to transmit the selected device or necessary data (e.g., instructions, initialization information, warnings, etc.) or to otherwise notify the user that a device is available for pick-up.

The network 126 facilitates communication between the various devices, modules and components of the weather content collection system 100. The network 126 may be the Internet, a direct connection or any other network capable of facilitating communication between the devices, modules and other components. The network 126 may be used to facilitate communication between the weather monitoring and prediction system 102 and the user 120 via the user's computer 124. This communication pertains to the use of weather observation devices 114 that have been sent to the user 120 as well as any other information an administrator of the weather content collection system 100 needs to communicate to the user 120 such as information on returning the device or warnings pertaining to severe weather events. The computer 124 can be a personal computer, a workstation or an Internet capable device such as a smart cell phone or a personal digital assistant.

Once the weather observation device 114 has collected or obtained the weather information (either automatically or as directed by the corresponding user 120), the results of the observation are sent to a weather collection system 130. The weather collection system 130 is a system or device capable of aggregating, evaluating and organizing the weather information collected by and obtained from the various weather observation devices 114. As such, the weather collection system 130 may be a computer, a collection of devices or any other arrangement capable of receiving the information from the weather observation devices 114 and aggregating, evaluating and organizing the information. The weather collection system 130 may be part of the weather monitoring and prediction system 102 or the broadcast system 134.

The weather information from the weather observation device(s) 114 may be transmitted to the weather collection system 130 in any manner in which the weather observation device 114 is capable. The weather observation devices 114 may have the capacity to transmit the observation devices in an automated and/or a user-initiated manner. Automated operation permits the results to be transmitted in real-time or transmitted at a later time. User-initiated operation permits transmission of the results directly from the device or indirectly by requiring an intermediate device, such as a computer, for transmission. For example, a video camera used for recording weather events may transmit the recorded video to the weather collection system 130 as it records (i.e., automated, real-time), transmit the video upon the video camera being shut down (i.e., automated, non-real-time), transmit the video when a user presses a button on the video camera (i.e., non-automated, direct) or require a user to connect the video camera to a personal computer and transmit the video using the personal computer (i.e., non-automated, indirect). Different weather observation devices 114 sent to the same user 120 in anticipation of the same weather event may have different transmission methodologies. For example, if a user 120 is sent a video camera, a barometer and a thermometry in anticipation of a hurricane, the barometer may transmit the barometric pressure to the weather collection system 130 automatically in real-time, the thermometer may transmit the temperature to the weather collection system 130 automatically every half hour and the video camera may require the user 120 to connect the video camera the user's personal computer for transmission or alternatively physically send the video camera or its recording medium to the weather collection system 130. For automated and direct non-automated transmission, any known transmission mechanism can be used for transmission. The weather observation device 114 may transmit information to the weather collection system 130 via a satellite link using a satellite device 172 (e.g., via satellite 128 and satellite dish 118 attached to the user's house 116), a telephone line (cellular or terrestrial), the network 126 or some other similar mechanism. When indirect non-automated transmission is used, the weather observation device 114 may transfer the weather information to a personal computer and transmit the information via the network 126 to the weather collection system 130. Alternatively, the user 120 manually inputs the data into a website or similar form and transmits the information to the weather collection system 130. In another alternative, the weather observation device 114 is physically sent to the weather collection system 130. For example, if the weather observation device 114 is a disposable camera or another device needing processing, the user 120 could send the weather observation device 114 to the weather collection system 130.

The weather collection system 130 receives weather information from multiple weather events in multiple regions at different times. The weather collection system 130 is capable of determining which to which weather event and region the data belongs when it is received from various weather observation devices 114. The weather collection system 130 is also capable of organizing and aggregating the weather information for retrieval based on weather event, region or time. For example, if a hurricane occurs on the eastern seaboard and a forest fire occurs in California, the weather collection system 130 may receive weather information from Atlanta, Myrtle Beach, Charlotte, Los Angeles and San Diego. The weather collection system 130 sorts the information based on the location from which the information is received, the time the information is received and the type or source of the information received. In this manner, the weather collection system 130 receives a broad picture of the weather conditions in various regions. The weather collection system 130 can determine that the hurricane has reached Atlanta, but has not yet reached Charlotte by analyzing the barometric pressure read from barometers in Charlotte and Atlanta, while simultaneously monitoring the forest fire by monitoring video cameras in Los Angeles and San Diego.

Once the weather data has been aggregated, it may be broadcast, displayed or otherwise presented to viewers. The weather collection system 130 sends the aggregated and analyzed information to the broadcast system 134. The weather collection system 130 can send this information through any capable transmission method including transmission using satellite devices 172 and 136 through a satellite 128, using network 126 or using a direct connection between weather collection system 130 and broadcast system 134. Broadcast system 134 arranges and broadcasts information received from the other parts of the weather content collection system 100. The information can be broadcast to a plurality of viewers 140 in a variety of ways. The broadcast system 134 can broadcast the collected data using known broadcast devices such as cable system 138, satellite system 136 or tradition broadcast system 148. The broadcast system 134 can also place the information on an Internet website. The broadcast information is received by viewers 140 at a viewing device such as a television or monitor 142, a computer 144, a radio 146 or any other device capable of receiving this information. Alternatively, the broadcast system can utilize radio tower 180 to broadcast the information to viewers 140 via radios 146. Additionally, any other system used to disseminate weather information can be used.

Those skilled in the art will recognize that a variety of ways of connecting, sending, receiving and broadcasting to implement the above described system could be used. The specific connections and capabilities discussed herein are merely examples and should not be construed as limiting.

Figure 2:
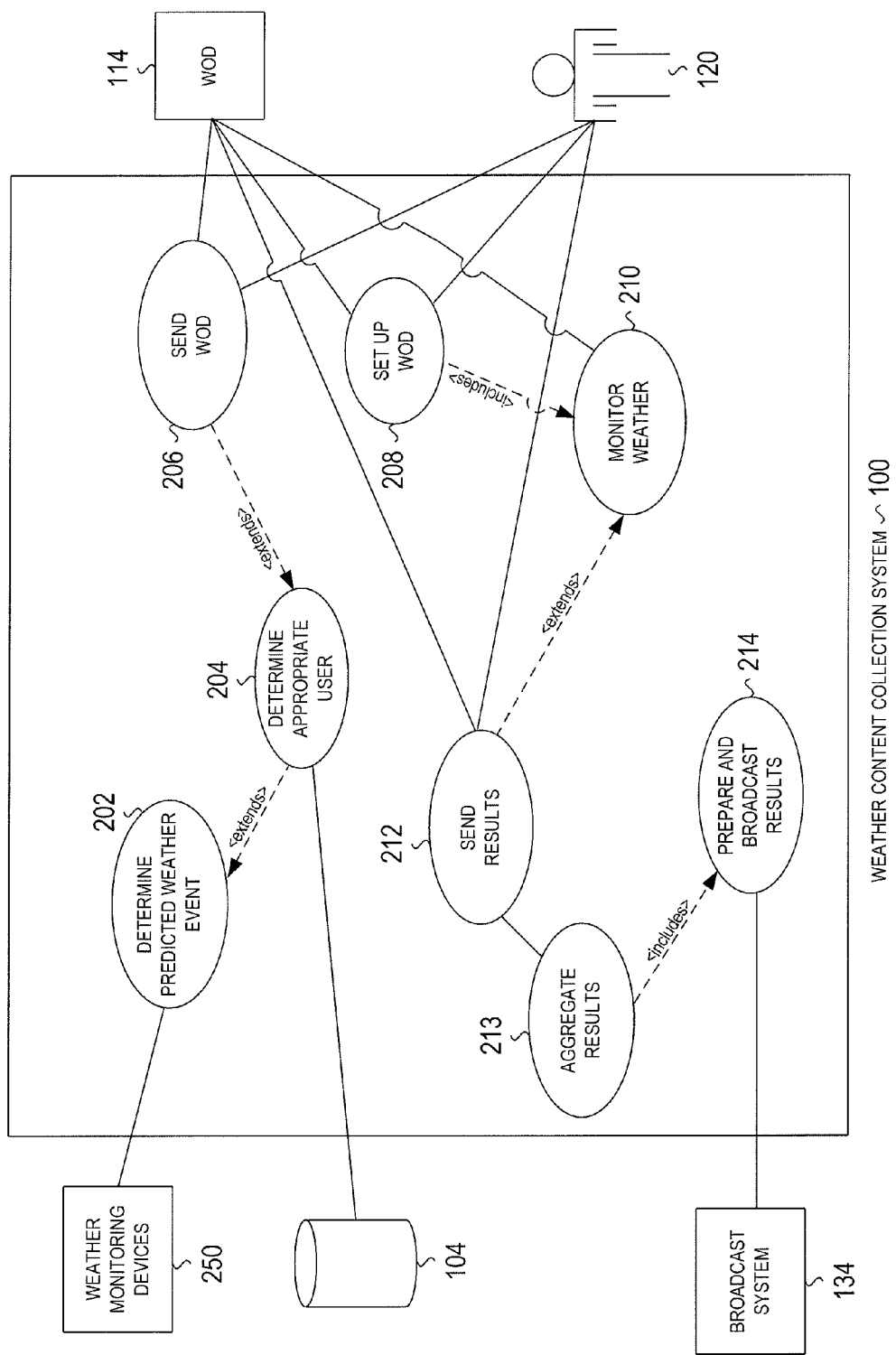
FIG. 2 is a use case diagram in accordance with the weather content collection system of FIG. 1.

FIG. 2 is a use case diagram of the weather content collection system 100 in accordance with one embodiment of the present invention. The weather collection system 100 includes a determine predicted weather event use case 202 that monitors geographic regions to detect potential weather events using weather monitoring devices 250. Weather monitoring devices 250 include the radar system 106, the satellite imagery system 108 as well as a lightening detection system, a surface weather observation station or some other device used to monitor current, past or future weather. The determine predicted weather event use case 202 extends to the identify appropriate user use case 204, which identifies users 120 in the affected geographic region using data stored on storage device 104. This occurs when the weather content collection system 100 determines a weather event is going to occur in a given geographic region. If appropriate users are found at the identify appropriate user use case 204, the send weather observation device use case 206 sends the weather observation device 114 to the users 120. The users 120 set up the weather observation device 114 to observe the weather at the setup weather observation device use case 208. The setup weather observation device use case 208 includes the monitor weather use case 210, in which the weather observation device 114 observes the weather and collects weather related data. The send results use case 212 extends the monitor weather use case 210 and is implemented when the weather event is over and the data has been collected. Alternatively, if the data is real-time data, such as a video, the send results use case 212 occurs as the monitor weather use case 210 is still monitoring the weather. The aggregate results use case 213 aggregates the results in preparation to send the aggregated results to the broadcast system 134. The prepare and broadcast results use case 214 is included with the aggregate results use case 213. The prepare and broadcast results use case 214 broadcasts the results of the observation using the broadcast system 134.

Figure 3:
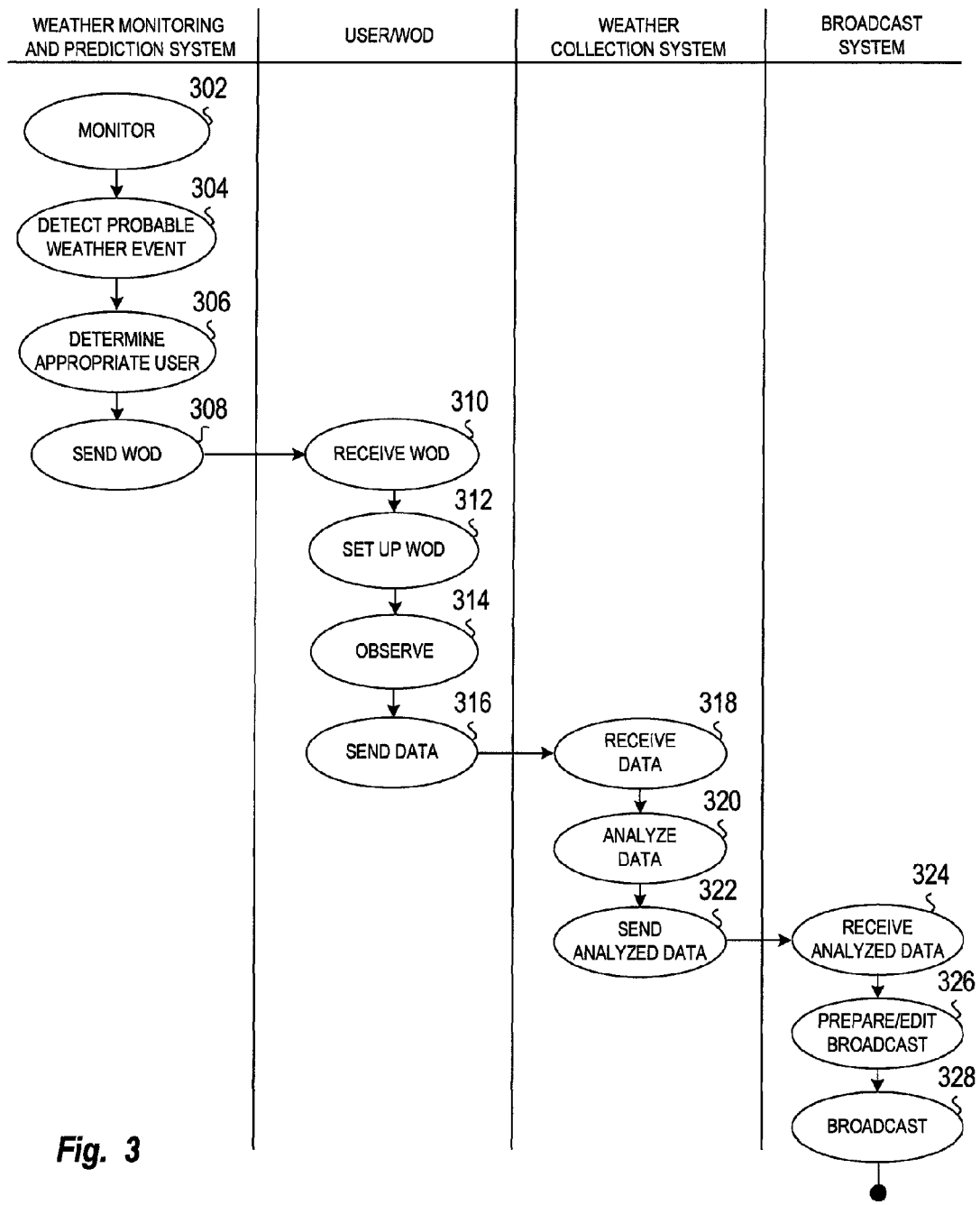
FIG. 3 is an activity diagram of an embodiment of the weather determination system of FIG. 1.

FIG. 3 is an activity diagram for collecting weather data from users using the weather content collection system 100. In FIG. 3, the weather monitoring and prediction system 102 monitors weather in a wide range of geographic regions at monitor step 302. The monitor step 302 monitors the weather for potential weather events and detects a probable weather event at the detect probable weather event step 304. When a probable weather event has been detected the weather monitoring and prediction system 102 determines if a user is located in the affected geographic region to participate in the weather content collection process at the determine appropriate user step 306. The determination process is accomplished by evaluating files (electronic or otherwise) of the users 120 and determining if they are located in or near the area where the probable weather event is expected to take place. Upon completion of this determination, the weather observation devices 114 are sent to the users 120 at the send weather observation devices step 308. The determination of which weather observation devices 114 to send is made based on the type of weather event. For example, if a hurricane is expected in a user's region, wind detectors, barometers and video cameras might be sent to users in the affected area. If a heat wave or drought is expected, thermometers and precipitation gauges might be sent. The weather observation devices 114 are received by the users 120 at the receive weather observation devices step 310. The users 120 set up the weather observation devices 114 at setup weather observation devices step 312. The weather observation devices 114 may communicate with the weather monitoring and prediction system 102 to receive any initialization information necessary. The weather observation device 114 observes the weather and stores the weather data at the observe step 314. As the collected weather data becomes available to be sent, the weather observation device 114 or the user 120 sends the data to the weather collection system 130 (as described above) at the send data step 316. The data sent at the send data step 316 is received by the weather collection system 130 at the receive data step 318. The data is then analyzed and aggregated with any other data previously or concurrently received by the weather collection system 130 at the analyze data step 320. The analyzing and aggregation process produces a summary of the relevant data, regardless of the type of data. The weather collection system 130 sends this analyzed and aggregated data to the broadcast system 134 at the send analyzed data step 322. The receive analyzed data step 324 receives the analyzed and aggregated data from the weather collection system 130. The prepare/edit broadcast step 326 includes any additional aggregating, editing or preparation of the broadcast necessary to broadcast the information on television, radio, the internet or other broadcast means. Upon conclusion of the preparation the broadcast step 328 broadcasts the information.

In an example of weather content collection system 100, a weather information provider, such as a television network, monitors and broadcasts weather information of a variety of geographic regions. Weather content is aggregated from a variety of different forecasting devices including a weather satellite and a radar system. Meteorologists view the weather data from these sources and a forecast is prepared for broadcast. In alternate examples, the system is automated. If a weather event such as a severe thunderstorm, a drought, a flood, a hurricane or a series of tornadoes is predicted in a geographic region, further information is desired about the conditions in that region. If, for example, a hurricane is predicted in the Gulf of Mexico, the weather information provider may want additional information on particular areas along the Gulf coast. The weather information provider maintains a database of individuals who would like to be involved in the weather forecast. The database is searched to find individuals who live in and around the Gulf coast. Prior to the predicted storm, the identified individuals are supplied with disposable cameras, video cameras, precipitation gauges, wind gauges and barometers. They may also be supplied with essentially any device that a meteorologist at the weather information provider deems necessary. As the predicted weather event begins, the devices begin to collect data related to the event. The video camera records the visual and audio information, the precipitation gauge collects information relating to rain fall, the wind gauge measures the wind and the barometer measures atmospheric pressure. All or part of the information is communicated back to the weather information provider in real-time, thereby giving the meteorologists at the weather information provider a substantial amount of information at the individual's location. In an alternate example, the information is sent back at a later time either through the device being connected to a computer, or alternatively, the individual with the device will send the device back to the weather information provider or communicate the data to the weather information provider. Once the information has been sent to the weather information provider, the information from the devices is aggregated with the information from other individuals who participated in evaluating the same weather event. By doing this, the weather information provider obtains barometric pressure, precipitation results, wind speeds and video and audio content from a variety of locations all pertaining to the same event. Once the information has been evaluated, the information is prepared to be broadcast. The information is used as part of a television broadcast, a radio broadcast, an Internet posting and any other broadcast means the weather information provider chooses. Alternatively, this information can be sold to other weather information providers.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

What is claimed is:

1. A method of collecting weather data, the method comprising:
    (a) maintaining geographic information corresponding to a plurality of user devices;
    (b) determining a probable occurrence of a weather event proximate to a geographic region;
    (c) determining that at least one of the user devices is associated with the geographic region;
    (d) sending, prior to the occurrence of the weather event, an initialization signal to the at least one user device associated with the geographic region; and
    (e) collecting data related to the weather event at the at least one user device associated with the geographic region during an actual occurrence of the weather event proximate to the geographic region.

2. The method of claim 1, wherein the initialization signal includes information related to the expected time of the weather event.

3. The method of claim 1, wherein sending the initialization signal includes identifying to a user the corresponding at least one user device to assist in the collecting data.

4. The method of claim 1, wherein the collected data includes real-time weather information corresponding to the weather event.

5. The method of claim 1, wherein the collected data includes real-time video of the weather event.

6. The method of claim 1, further comprising:
    (f) verifying the existence of the weather event by analyzing the data collected in step (e).

7. The method of claim 1, further comprising:
    (f) analyzing the data collected in step (e) to determine properties of the weather event.

8. The method of claim 1, further comprising:
    (f) collecting data related to the weather event at the at least one user device associated with the geographic region after an actual occurrence of the weather event proximate to the geographic region.

9. The method of claim 1, further comprising:
    (f) transmitting the collected data to a weather collection center.

10. The method of claim 9, wherein step (f) includes transmitting the collected data automatically as the data is collected.

11. A method of collecting weather data from a cellular telephone, the method comprising:
    (a) supplying a plurality of cellular phones with a computer program associated with the collection of weather data;
    (b) maintaining geographic information corresponding to the plurality of cellular telephones;
    (c) determining a probable occurrence of a weather event proximate to a geographic region;
    (d) determining that at least one of the cellular telephones is associated with the geographic region;
    (e) sending, via the computer program prior to the occurrence of the weather event, an initialization signal to the at least one cellular phone associated with the geographic region; and
    (f) collecting data related to the weather event at the at least one cellular telephone associated with the geographic region during an actual occurrence of the weather event proximate to the geographic area.

12. The method of claim 11, wherein the initialization signal includes information relating to the expected time of the weather event.

13. The method of claim 11, wherein sending the initialization signal includes identifying to a user the corresponding at least one cellular phone associated with the geographic region to assist in the collecting data.

14. The method of claim 11, wherein the collecting data includes collecting data from a geographic positioning system of the at least one cellular telephone associated with the geographic region.

15. The method of claim 11, wherein the collected data includes real-time weather information corresponding to the weather event.

16. The method of claim 11, further comprising:
   (g) collecting data related to the weather event at the at least one cellular phone associated with the geographic region after an actual occurrence of the weather event proximate to the geographic region.

17. The method of claim 11, further comprising:
   (g) receiving the collected data from the at least one cellular phone associated with the geographic region at the weather collection center.

18. The method of claim 17, wherein step (g) includes transmitting the collected data automatically as the data is collected.

19. The method of claim 17, further comprising:
   (h) verifying the existence of the weather event by analyzing the data received in step (f).

20. A computer program product, comprising a computer readable program code capable of being installed on a user device, said computer readable program code adapted to be executed on the user device to implement a method of collecting and transmitting weather data, said method comprising:
   (a) determining a geographic region associated with the user device;
   (b) receiving a signal indicating a probable occurrence of a weather event corresponding to the geographic region associated with the user device, wherein the signal at least includes an indication of a type of weather event and weather event monitoring instructions;
   (c) collecting data related to the weather event in accordance with the weather event monitoring instructions; and
   (d) transmitting the collected data to a weather collection center.

21. The computer program product of claim 20, wherein the user device is a cellular telephone.

22. The computer program product of claim 20, wherein the signal indicating the probable occurrence of a weather event causes the user device to display information to a user pertaining to assistance in collecting data related to the weather event.

23. The computer program product of claim of claim 20, wherein the collected data includes real-time weather information corresponding to the weather event.

24. The computer program product of claim of claim 20, wherein the transmitting occurs automatically as the data is collected.

25. A method of collecting and transmitting weather data at a user device, said method comprising:
   (a) receiving, at the user device, a computer program associated with the collection of weather data;
   (b) receiving a signal indicating a probable occurrence of a weather event corresponding to a geographic region associated with the user device, wherein the signal at least includes an indication of a type of weather event and weather event monitoring instructions;
   (c) collecting data related to the weather event in accordance with the weather event monitoring instructions; and
   (d) transmitting the collected data to a weather collection center.

26. The method of claim 25, wherein the user device is a cellular telephone.

27. The method of claim 25, wherein the signal indicating the probable occurrence of a weather event causes the user device to display information to a user pertaining to assistance in collecting data related to the weather event.

28. The method of claim 25, wherein the collected data includes real-time weather information corresponding to the weather event.

29. The method of claim 25, wherein the transmitting occurs automatically as the data is collected.

* * * * *